April 22, 1969      V. K. RELF      3,439,873
BI-DIRECTIONAL PRESSURE RELIEF VALVE
Filed March 17, 1967
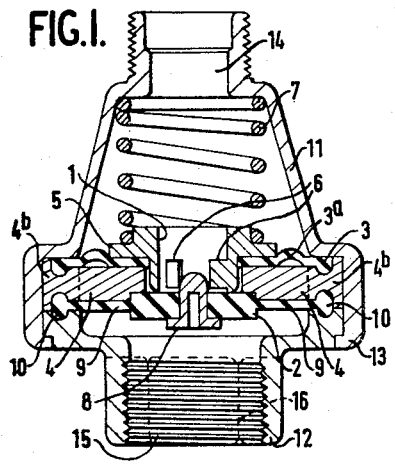
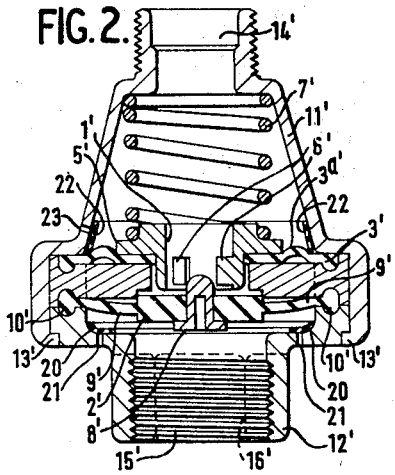
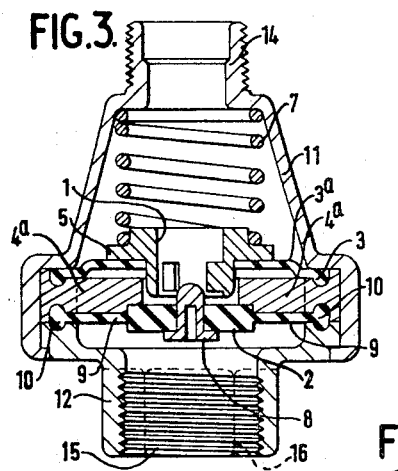
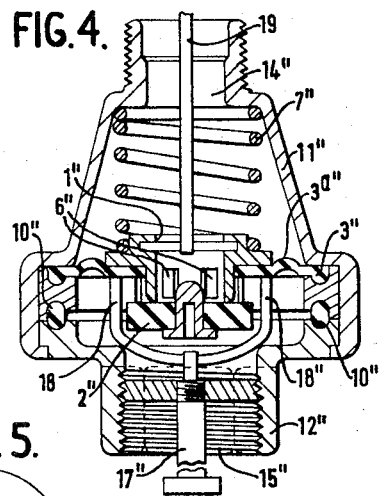
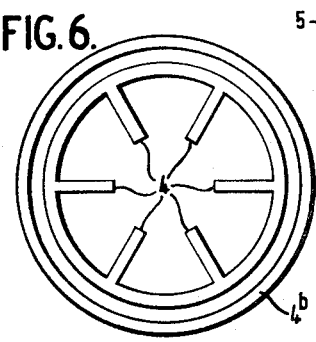
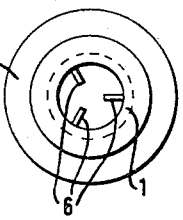
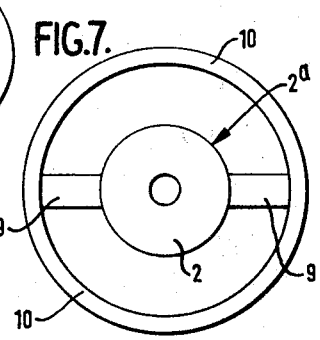

United States Patent Office 3,439,873
Patented Apr. 22, 1969

1

3,439,873
BI-DIRECTIONAL PRESSURE RELIEF VALVE
Victor K. Relf, Auckland, New Zealand, asisgnor to Victor Enterprises Limited, Auckland, New Zealand
Filed Mar. 17, 1967, Ser. No. 623,967
Int. Cl. G05d 27/00; F16k 17/14, 17/06
U.S. Cl. 236—92                    9 Claims

ABSTRACT OF THE DISCLOSURE

A pressure relief valve in which a housing is provided with an inlet and outlet and a pressure sensitive diaphragm between the inlet and outlet. A relief port is mounted on the diaphragm and seating means is capable of closing the relief port up to predetermined pressure in one direction and of moving away from such port under the influence of pressure in the other direction.

---

This invention relates to improvements in relief or safety valve design with particular advantages for use in situations where a substantially unrestricted return flow through the valve is required, for example an air return system that will allow the substantially unrestricted flow of air to pass back into a vessel, while providing a predetermined pressure relief characteristic in the other direction to enable the pressurization of a vessel up to the predetermined limit of the set pressure characteristic of the valve. The improved valve according to this invention is especially suitable for use with domestic hot water heaters but may also be used for other purposes.

It is an object of the present invention to provide a valve that will be positively responsive to the above-mentioned conditions and in particular shall be constructed in the manner described below. Other objects and advantages of the invention will be apparent from the following description.

According to one aspect of the invention the pressure relief valve comprises a housing, an inlet and an outlet to said housing, a pressure sensitive means provided within said housing between said inlet and said outlet, a relief port mounted on said pressure sensitive means, seating means capable of closing said relief port up to a predetermined pressure in one direction and capable of moving away from said relief port under the influence of pressure in the other direction.

According to a further aspect of the invention, the pressure relief valve comprises a housing, an inlet and an outlet to said housing, a pressure sensitive means provided within said housing and a relief port provided on said pressure sensitive means characterised in that said relief port permits both pressure relief and return of air.

Other novel aspects of the invention will be apparent from the following description of a preferred embodiment of the invention, which is given by way of example, with the aid of the accompanying drawings in which:

FIG. 1 is a cross sectional elevation of a preferred embodiment of the invention showing the valve in a closed position, FIG. 2 is a cross section elevation similar to FIG. 1 of another embodiment, showing the seating means moved away from the relief port and permitting air to pass back through the valve, FIG. 3 is a cross sectional elevation similar to FIG. 1 showing the relief port raised above the sealing means to permit excess pressure to escape, FIG. 4 is a cross sectional elevation, at right angles to FIGS. 1, 2 and 3 of yet another embodiment of the invention, FIG. 5 is a plan view of the relief port,

2

FIG. 6 is a plan view of the support member, and
FIG. 7 is a plan view of the seating means.

In the preferred embodiment of the invention as illustrated in the accompanying drawings, one of the main features differentiating the invention from currently known types of relief valves is a concentrically arranged construction. A suitable housing is provided preferably consisting of two portions 11 and 12 which are peened together at 13, or otherwise suitably joined. The upper portion 11, which is circular in cross section, may be of frusto-conical formation, having an outlet 14 which is exteriorly threaded. The lower portion 12 is formed with an inlet 15 which is interiorly threaded, the outer sides of the inlet 15 preferably being of hexagonal cross section as indicated at 16.

A pressure responsive means, such as annular diaphragm 3, is provided with the actual relief port 1 situated centrally in the diaphragm 3, with the relief passage for excess pressure passing from the inlet 15 of the pressure sensitive diaphragm 3 through the relief port 1 to the other side of said diaphragm and thence to atmosphere through outlet 14. As shown in the drawings the relief port 1 is preferably of cross section and is formed with a rounded facing edge which seals against the upper side a seating means 2. Fins 6 may be formed within the relief port 1 recessed for a short distance above the facing edge to prevent undue distortion of the seating means 2 under pressure if such should occur.

The centrally located and loosely seating means 2 is held against the relief port 1 by the pressure under which the valve is normally required to operate and retain. Any increase in this pressure, above a predetermined level, causes the diaphragm 3 and relief port 1 to move away from said seating means 2 which, while loosely supported, is restrained from following the diaphragm 3 in this direction and therefore causes the uncovering of the relief port 1 through which the excess pressure whether it be liquid or gas, can escape.

In FIG. 7 it will be noted that the seating means is connected to an elastic O-ring 10 or similarly shaped component that fits into a suitably dimensioned groove formed in a circular connecting band 4b and the housing portion 12, and supports the seating means 2 on two or more flexible arms 9.

One means of restraining the seating means 2 is by means of a radially disposed multiplicity of fingers 4 which protrude laterally in the same plane as the diaphragm 3 and bear directly on the underside of and support the diaphragm 3 when the valve is inoperative. The fingers 4 are joined together at their outer ends by the connecting band 4b. The fingers 4 protrude, at 4a, under outer edge 2a of the seating means 2 which to facilitate this is suitably larger in diameter than the actual sealing face of relief port 1 it is called on to cover. Therefore, as described above, and as shown in FIG. 3, when the relief port 1 which is attached to the pressure sensitive diaphragm 3 moves away under the influence of excess pressure, the diaphragm 3 leaves the support of the radially disposed fingers 4 while the seating means 2 becomes engaged in said radially disposed fingers 4 causing the unseating or cracking of the valve and allowing the excess pressure to escape through outlet 14.

On the reverse side of the diaphragm 3 which is open to atmosphere there is provided a stiffening support ring or backing plate 5 which is preferably formed as part of the relief port 1, and which is attached to and covers the greater part of the diaphragm 3 leaving a small annular section 3a around the outer edge to allow flexibility or the forward and backward movement of the diaphragm 3.

A spring 7 of predetermined pressure is located on the atmosphere side of the diaphragm 3 bearing against the back of the diaphragm 3 or backing plate 5 and exerting a constant pressure upon the diaphragm 3. The pressure exerted by this spring 7 determines the pressure of gas or liquid on the other side of the diaphragm 3 necessary to move the diaphragm 3 and relief port 1 away from the seating means 2 by the compressing of the spring 7.

A further feature may be incorporated in valves according to this invention when used in the control of liquids or gases where both pressure and temperature may require individual relief means. A fusible plug 8 may be located centrally in the seating means 2 so that in the event of excess temperature acting upon the valve, the plug 8 will melt, allowing a clear passage straight through the center of the seating means 2 and on through the relief port 1 to the atmosphere side of the diaphragm 3. Additional temperature relief means may also take the form of a thermally responsive piston type thermostat 17 (as shown in FIG. 4) and which is suspended centrally in the inlet 15" of the valve and bears against supporting legs 18 which protrude through the fingers 4" and bear against the diaphragm 3" and are preferably arranged in such a way as to not impede the flow of gas or liquid nor the free movement of the seating means 2". The thermostat 17, upon the pressure of excess temperature, would apply pressure to the extension 18 and so move the diaphragm 3" and relief port 1" away from the seating means 2".

As the seating means 2 is loosely attached to the surrounding valve members, it is freely able to move away from the relief port 1 in the case of zero pressure, as shown in FIG. 2, and to allow a free flow of air back from the atmosphere side of the relief valve.

In its simplest and preferred form, as shown in FIGS. 1 and 3, the valve is envisaged as a concentrically constructed unit, the seating means 2, fuse plug 8, diaphragm 3, spring 7 and outlet 14 all being arranged concentrically around a common central line. Additional features which may be added are a dual inlet or two-way inlet connection so that the valve may be connected in a line and act as a pressure relief branch means. A further feature is the addition of a manual lifting device, such as rod 19 shown in FIG. 4, which is operated through the outlet 14 from the valve and coaxially with the common center line of the other components while the actual fluid or gas relief outlet attached to outlet 14" can branch at right angles so that the operation of lifting device 19 does not impede the flow through the outlet 14" or hinder the connection of a drain pipe from the valve.

While in the preferred embodiment valve described above it is seen that the relief of excess pressure and the return of air takes place through a common seating which in turn may be connected to a drain to take any liquid or gas vented from the valve to a suitable safe place, it is further envisaged that under circumstances due to the entrapment of liquid in said drain line, an additional sensitive means of air return may be required and, as shown in FIG. 2, this may be provided in the form of a series of flaps or a flexible sleeve 20 formed of rubber or other suitable material located in the chamber 12' and bearing against the inside circular wall. Beneath said sleeve 20 are disposed one or more suitably sized and shaped holes 21 which are kept closed by the pressure in the portion 12 bearing outward against said sleeve 20 which covers said holes 21. However, in the event of zero pressure, the atmosphere can flow through said holes 21, collapsing or pushing aside said rubber sleeve 20.

An alternative form of air return can be provided in the form of a light conical flange 22 which may be mounted in the portion 11', with the lower edge preferably bearing against annular section 3a' of the diaphragm 3' and the upper edge bearing against the interior wall of the portion 11'. When any zero pressure may occur within the valve the upper edge will collapse inwardly and allow air to pass through one or more suitable apertures 23.

It will be noted from the foregoing description that unlike other diaphragm operated relief valves, the present relief valve allows, in the event of a diaphragm failure or rupture, the liquid or gas escaping from said failure or rupture, to escape through the outlet 14 from the relief valve via any drain which may be provided, rather than directly to atmosphere which in the case of relief valves installed in homes on hot water services and in various other commercial premises where such liquid escape would be a nuisance or hazard. In the case of the present valve, any escaping gas or liquid is confined to the normal passage provided for such an escape.

It will be appreciated that in operation, the relief port mounted on the diaphragm 3 is capable of being closed by the seating means 2 under the influence of pressure from the inlet 15 while the diaphragm is seated on the fingers 4. The seating means is capable of moving freely away from the relief port 1 under the influence of pressure from the outlet 14.

The valve may be constructed from various suitable materials and the housing may be formed from two plastics moldings which may be permanently sealed together around the pressure sensitive means. In the event of such permanent forming, access to and removal of the seating means and fuse plug may be had through the inlet, with the seating means and fuse being so constructed that they can be easily removed and replaced via the inlet.

The scope of the invention is envisioned in various forms ranging from a simple valve incorporating only a pressure sensitive diaphragm and seating means through to various combinations involving any or all of the additional features of variations described therein. Accordingly the invention is not limited to the preferred embodiments which have been described by way of example, but modifications may be made to the valve without departing from the scope of the invention as defined in the appended claims.

What I do claim and desire to obtain by Letters Patent of the United States of America is:

1. A pressure relief valve comprising a housing, an inlet and outlet to said housing, an annular pressure sensitive diaphragm within said housing between said inlet and outlet, a plurality of radially disposed fingers mounted within said housing between said diaphragm and said inlet, a pressure relief port mounted on said diaphragm, a compression spring located between said outlet and said relief port for seating said diaphragm on said fingers, said relief port extending into a central opening provided between said fingers, a disc-shaped seating means suspended within said housing between said fingers and said relief port by flexible arms integral therewith, the arms being fixed within the housing at their ends remote from the seating means, and the seating means being capable of closing said relief port under the influence of pressure from said inlet while said diaphragm is seated on said fingers, said seating means being capable of moving freely away from said relief port under the influence of pressure from the outlet.

2. The pressure relief valve as claimed in claim 1 wherein said fingers protrude laterally in the same plane as the pressure sensitive diaphragm and bear on the underside and support said pressure sensitive diaphragm when the valve is inoperative.

3. The pressure relief valve as claimed in claim 2 wherein the seating means is larger in diameter than the relief port and wherein the fingers protrude over the outer edge of the seating means and wherein the seating means is loosely supported and is capable of being held against the relief port by the pressure under which the valve is normally required to operate and retain.

4. The pressure relief valve as claimed in claim 1 wherein the seating means is connected by the flexible arms to an O-ring fitting into a groove formed with a circular connecting band and said housing.

5. The pressure relief valve as claimed in claim 1 wherein a heat fusible plug is located in the seating means and wherein the plug is adapted to melt in the event of excess temperature acting upon the valve and provide a clear passage through the valve.

6. The pressure relief valve as claimed in claim 1 wherein a thermostat is suspended in the inlet and which is arranged in the event of excess temperature to move the pressure sensitive diaphragm and relief port away from the seating means.

7. The pressure relief valve as claimed in claim 1 wherein a manual lifting device is provided which may be operated through the outlet to raise the relief port from the seating means.

8. The pressure relief valve as claimed in claim 1 wherein air return means additional to said outlet, are provided in the housing on the inlet side of the pressure sensitive diaphragm comprising at least one aperture and a flexible sleeve which keeps said at least one aperture closed by the pressure bearing against the sleeve, but which in the case of reduced pressure will readily collapse aside said sleeve and allow air to flow in through said at least one aperture.

9. The pressure relief valve as claimed in claim 1 wherein air return means, additional to said outlet, are provided on the atmosphere side of the pressure sensitive diaphragm, consisting of a light conical flange, one edge of which bears against the pressure sensitive diaphragm and the other edge of which normally bears against the inner wall of the housing so as to cover at least one aperture in the wall of said housing, and wherein the flange will bend inwardly under reduced pressure and allow air to pass into the valve.

References Cited
UNITED STATES PATENTS

| | | | |
|---|---|---|---|
| 770,043 | 9/1904 | Bode et al. | 137—522 |
| 2,589,072 | 3/1952 | Garretson | 137—73 |
| 2,674,268 | 4/1954 | Kimm | 137—493 X |
| 2,747,594 | 5/1956 | Boetjer | 137—493.9 |
| 2,785,861 | 3/1957 | Kimm et al. | 236—92 |
| 2,986,159 | 5/1961 | Snyder | 137—508 X |
| 3,108,610 | 10/1963 | De See | 137—493 |
| 3,216,608 | 11/1965 | McCormick | 137—493 |
| 3,304,952 | 2/1967 | Krone | 137—493.9 |

ROBERT A. O'LEARY, *Primary Examiner.*

W. E. WAYNER, *Assistant Examiner.*

U.S. Cl. X.R.

137—73, 508, 493.9